(12) United States Patent
Salter et al.

(10) Patent No.: US 12,261,315 B2
(45) Date of Patent: Mar. 25, 2025

(54) BATTERY HOUSING ASSEMBLY FOR ELECTRIC VEHICLES

(71) Applicant: Ford Global Technologies, LLC, Dearborn, MI (US)

(72) Inventors: Stuart C. Salter, White Lake, MI (US); Renata Michaela Arsenault, Plymouth, MI (US); David Brian Glickman, Southfield, MI (US); Kent Snyder, Dearborn, MI (US); Brian Joseph Robert, Saint Clair Shores, MI (US); Ann O'Neill, Dearborn, MI (US); Lorne Forsythe, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 17/726,111

(22) Filed: Apr. 21, 2022

(65) Prior Publication Data

US 2023/0344058 A1 Oct. 26, 2023

(51) Int. Cl.
*H01M 50/249* (2021.01)
*H01M 50/224* (2021.01)
(Continued)

(52) U.S. Cl.
CPC ....... *H01M 50/249* (2021.01); *H01M 50/224* (2021.01); *H01M 50/24* (2021.01);
(Continued)

(58) Field of Classification Search
CPC .. H01M 50/249; H01M 50/224; H01M 50/24; H01M 50/244; H01M 50/271; H01M 2220/20; H01M 50/262; Y02E 60/10
See application file for complete search history.

(56) References Cited

U.S. PATENT DOCUMENTS 10,847,767 B2 * 11/2020 Pellenc ............... H01M 50/213
11,652,253 B2 *  5/2023 Smith ................ H01M 50/209
                                                              429/185

(Continued)

FOREIGN PATENT DOCUMENTS

CN      107086281 A  *  8/2017  .......... H01M 10/052
CN      112138753        12/2020
(Continued)

OTHER PUBLICATIONS

Translated CN-113904056-A (Year: 2024).*
(Continued)

*Primary Examiner* — James A Shriver, II
*Assistant Examiner* — Ian Bryce Shelton
(74) *Attorney, Agent, or Firm* — Burris Law, PLLC

(57) ABSTRACT

A battery housing assembly for housing battery components of an electric vehicle includes a battery tray, a lid, and a sealant. The battery tray includes a channel located outwardly relative to the battery components. The lid is secured to the battery tray and includes an end portion disposed within the channel. The lid further includes at least one alignment feature configured to align the lid and the battery tray. The sealant is disposed within a portion of the channel of the battery tray and is configured to secure the battery tray and the lid to each other. The sealant is further configured to seal an internal cavity of the battery housing assembly.

19 Claims, 3 Drawing Sheets

(51) Int. Cl.
*H01M 50/24* (2021.01)
*H01M 50/244* (2021.01)
*H01M 50/271* (2021.01)

(52) U.S. Cl.
CPC ....... *H01M 50/244* (2021.01); *H01M 50/271* (2021.01); *H01M 2220/20* (2013.01)

(56) References Cited

U.S. PATENT DOCUMENTS

| | | | | |
|---|---|---|---|---|
| 2012/0103714 | A1* | 5/2012 | Choi | B60K 1/04 |
| | | | | 180/68.5 |
| 2015/0079458 | A1* | 3/2015 | Maguire | H01M 50/224 |
| | | | | 429/163 |
| 2020/0052252 | A1* | 2/2020 | Smith | H01M 50/271 |
| 2020/0176740 | A1* | 6/2020 | Cassard | H01M 10/6556 |
| 2020/0411815 | A1 | 12/2020 | Shin et al. | |
| 2021/0234187 | A1* | 7/2021 | Hamaoka | H01M 10/0585 |
| 2021/0273285 | A1* | 9/2021 | Bluemel | H01M 50/271 |
| 2022/0006150 | A1* | 1/2022 | Foran | H01M 50/227 |
| 2023/0142307 | A1* | 5/2023 | Tashiro | H01G 11/82 |
| | | | | 429/96 |
| 2023/0163400 | A1* | 5/2023 | Hoggarth | H01M 50/209 |
| | | | | 429/99 |
| 2023/0207946 | A1* | 6/2023 | Chen | H01M 50/247 |
| | | | | 429/156 |
| 2024/0234897 | A1* | 7/2024 | Luo | H01M 50/271 |

FOREIGN PATENT DOCUMENTS

| | | | | |
|---|---|---|---|---|
| CN | 213304274 | | 5/2021 | |
| CN | 109449520 | | 9/2021 | |
| CN | 113904056 | | 1/2022 | |
| CN | 113904056 A | * | 1/2022 | |
| DE | 102018211473 B3 | * | 9/2019 | |
| DE | 102019206893 A1 | * | 11/2020 | ............ B60K 1/04 |
| DE | 102019220260 A1 | * | 6/2021 | |
| JP | 2012151076 A | * | 8/2012 | ............ B60K 1/04 |
| WO | WO-2017115404 A1 | * | 7/2017 | ............ H01M 2/024 |
| WO | WO-2021193557 A1 | * | 9/2021 | ............ H01G 11/10 |

OTHER PUBLICATIONS

Translated WO-2017115404-A1 (Year: 2024).*
Current Automotive, How Much Does A Tesla Model 3 Battery Replacement Cost?, 2023, 8 pages, available at URL https://www.currentautomotive.com/how-much-does-a-tesla-model-3-battery-replacement-cost/.

* cited by examiner

BATTERY HOUSING ASSEMBLY FOR ELECTRIC VEHICLES

FIELD

The present disclosure relates to a battery housing assembly for an electric vehicle, and more particularly to an electric vehicle including a battery housing assembly.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs disposed within a battery housing and having lithium-ion batteries cell assemblies such as modules or arrays, for example, or any other suitable electrical power storage units. The battery pack typically powers one or more motors to drive a set of wheels. The size and weight of the battery pack is typically greater for electric vehicles capable of traveling long distances, for example, therefore, requiring larger battery trays. The present disclosure addresses these issues related to battery trays that house battery packs in electric vehicles.

SUMMARY

This section provides a general summary of the disclosure and is not a comprehensive disclosure of its full scope or all of its features.

In one form, a battery housing assembly for housing battery components of an electric vehicle includes a battery tray, a lid, and a sealant. The battery tray includes a channel located outwardly relative to the battery components. The lid is secured to the battery tray and includes an end portion disposed within the channel. The lid further includes at least one alignment feature configured to align the lid and the battery tray. The sealant is disposed within a portion of the channel of the battery tray and is configured to secure the battery tray and the lid to each other. The sealant is further configured to seal an internal cavity of the battery housing assembly.

In variations of the battery housing assembly of the above paragraph, which may be implemented individually or in any combination: the battery tray is made of a metal material; the lid is made of a composite material; the battery tray comprises an outer wall and an inner wall that cooperate to define the channel, the inner wall is located inwardly relative to the end portion of the lid; the lid comprises a planar upper portion, at least one alignment feature extends downwardly from an inner surface of the planar upper portion to contact the inner wall of the battery tray; the battery tray comprises an outer wall and an inner wall that cooperate to define the channel; the inner wall has a height that is greater than height of the outer wall; the inner wall has a thickness greater than a thickness of the outer wall; at least one alignment feature is disposed within the channel of the battery tray and extends laterally from the end portion of the lid to align the lid and the battery tray in a lateral direction; the lid comprises a planar upper portion, at least one alignment feature extends downwardly from an inner surface of the planar upper portion to contact the battery tray; a lid detachment feature is associated with the end portion of the lid and located external to the channel; and the battery tray comprises an outer wall and an inner wall that cooperate to define the channel, the lid detachment feature is vertically spaced apart from an upper surface of the outer wall.

In another form, a battery housing assembly for housing battery components of an electric vehicle includes a battery tray, a lid, and a sealant. The battery tray comprises an outer wall and an inner wall that cooperate to define a channel located outwardly relative to the battery components. The inner wall extends upward a distance further than the outer wall. The lid is secured to the battery tray and comprises an end portion disposed within the channel. The lid further comprises at least one alignment feature configured to align the lid and the battery tray. The sealant is disposed within a portion of the channel of the battery tray and is configured to secure the battery tray and the lid to each other. The sealant further is configured to seal an internal cavity of the battery housing assembly.

In yet another form, a battery housing assembly for housing battery components of an electric vehicle includes a battery tray, a lid, a sealant, and a lid detachment feature. The battery tray comprises an outer wall and an inner wall that cooperate to define a channel located outwardly relative to the battery components. The inner wall extends upward a distance further than the outer wall. The lid is removably secured to the battery tray and comprises an upper planar portion and an end portion extending from the upper planar portion and disposed within the channel. The lid further comprises a plurality of alignment features configured to align the lid and the battery tray. The sealant is disposed within a portion of the channel of the battery tray and is configured to secure the battery tray and the lid to each other. The sealant is further configured to seal an internal cavity of the battery housing assembly. The lid detachment feature is associated with the end portion of the lid and located external to the channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
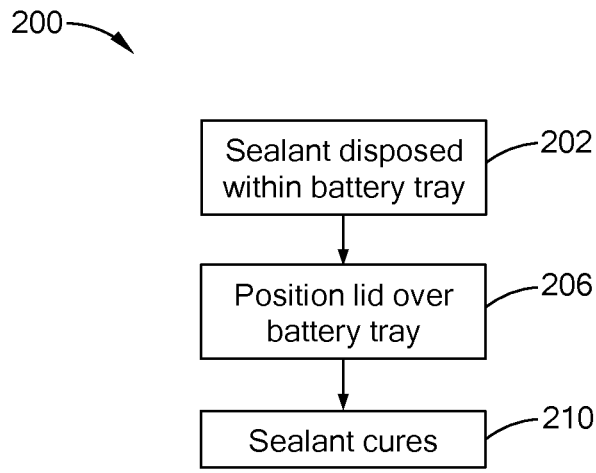
Figure 4:
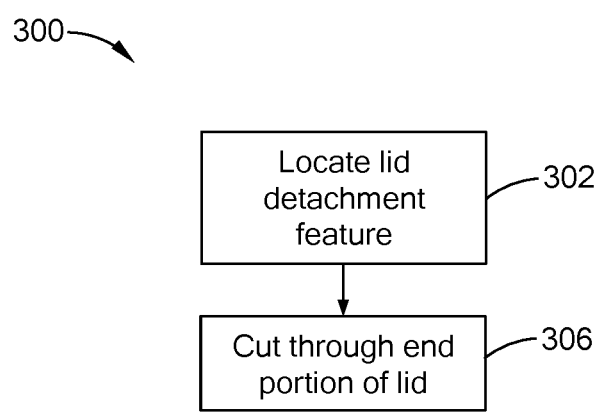

FIG. 3 is a flow chart illustrating a method for attaching a lid of the battery housing assembly to a battery tray of the battery housing assembly in accordance with the teachings of the present disclosure; and FIG. 4 is a flow chart illustrating a method for removing the lid of the battery housing assembly from the battery tray of the battery housing assembly in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
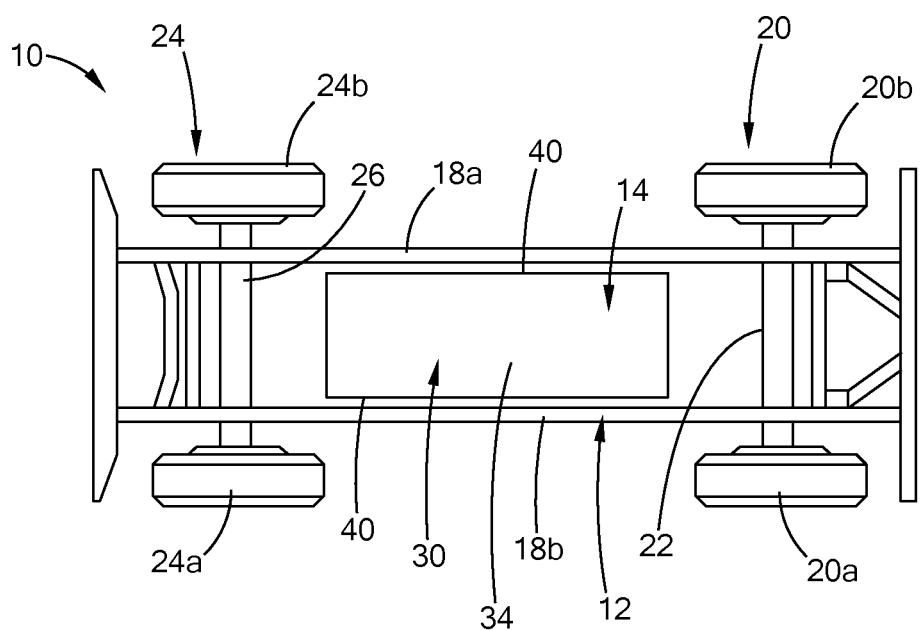
FIG. 1 is a schematic view of a vehicle including a battery housing assembly according to the principles of the present disclosure.

With reference to FIG. 1, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12 and a battery housing assembly 14. The vehicle frame 12 is the main supporting structure of the vehicle 10, to which various components are attached either directly or indirectly. The vehicle frame 12 includes opposed longitudinal rails 18a, 18b. The rails 18a, 18b are spaced apart from each other and may establish a length of the vehicle frame 12.

The battery housing assembly 14 powers a rear motor (not shown) to drive rear wheels 20a, 20b of a set of rear wheels 20 via a rear axle 22. Similarly, the battery housing assembly 14 powers a front motor (not shown) to drive front wheels 24a, 24b of a set of front wheels 24 via a front axle 26.

Figure 2:
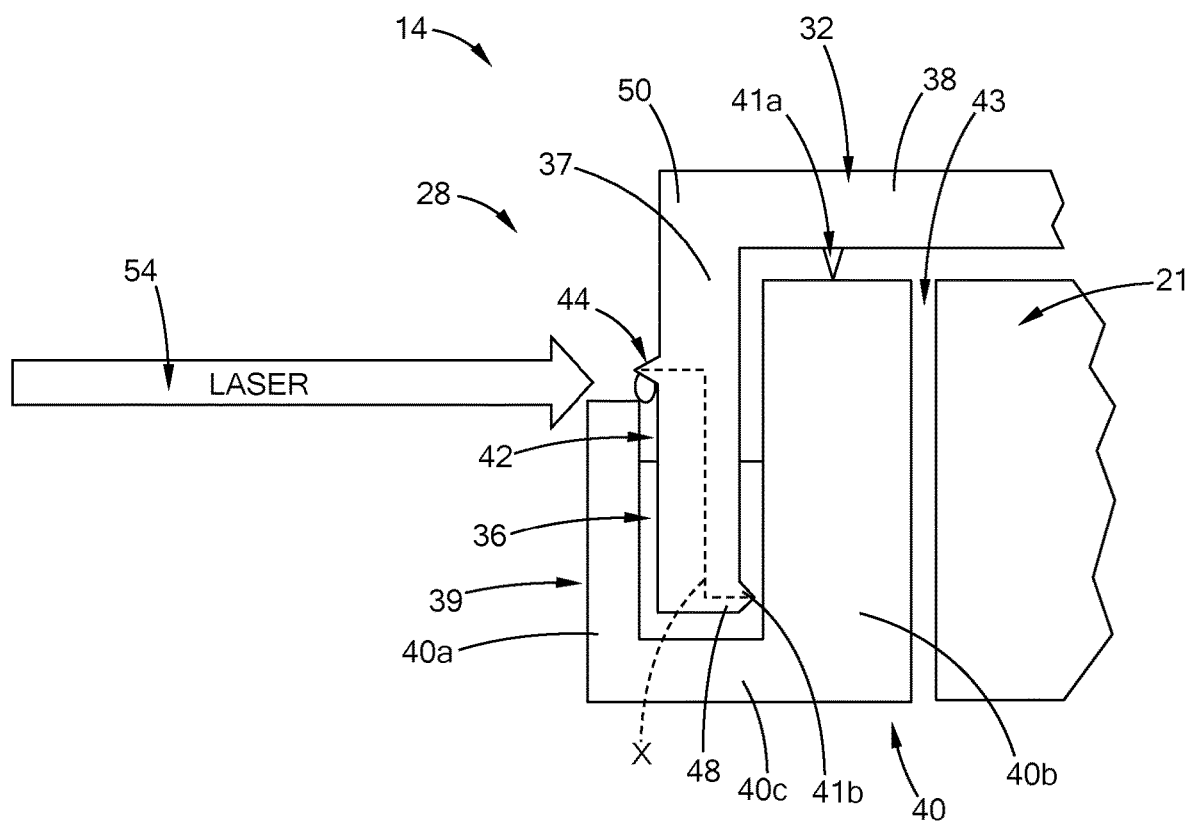
FIG. 2 is a partial cross-sectional view of the battery housing assembly of FIG. 1.

With additional reference to FIG. 2, the battery housing assembly 14 includes one or more battery components 21 and a battery housing 28. The battery housing 28 is an enclosure which provides a structural surrounding and sealed compartment for the battery components 21 such as battery arrays, cooling lines, support brackets, and/or wiring disposed therein. The battery arrays may be rechargeable and may include lithium-ion batteries or any other suitable electrical power storage units. In some forms, the battery arrays are stacked on top of each other. In some forms, the battery arrays include battery cells electrically connected in series, parallel, or series/parallel configuration.

The battery housing 28 may disposed at various locations of the vehicle 10 and is mounted to the vehicle frame 12. In this way, the battery housing 28 is supported by the vehicle frame 12 and is remote from a passenger cabin (not shown) and cargo compartments (not shown) of the vehicle 10, therefore, not occupying space that would otherwise be available for passengers or cargo. The battery housing 28 includes a battery tray 30 (FIG. 1), a cover or lid 32, a plurality of connecting members (not shown), and a sealant 36.

With reference to FIG. 3, the battery tray 30 is made of a metal material such as aluminum, for example, and includes a bottom wall or panel 34 (FIG. 1) and a side wall 40. In some forms, the battery tray 30 is made of a composite material. The bottom wall 34 supports the battery components 21 disposed within the battery housing 28 and is secured to a lower portion of the side wall 40. For example, the bottom wall 34 is secured to the lower portion of the side wall 40 via welding, an adhesive, or any other suitable attachment means. The side wall 40 is manufactured via stamping, for example, and defines an outer boundary of the battery housing 28. The side wall 40 comprises a lid receiving portion 39 including an outer wall 40a, an inner wall 40b, and a lower wall 40c connecting the outer wall 40a and the inner wall 40b. The outer wall 40a, the inner wall 40b, and the lower wall 40c cooperate with each other to define a cavity or channel 42 that receives a portion of the lid 32. The cavity 42 is located outwardly relative to an internal cavity 43 of the battery tray 30 housing the battery components 21. The inner wall 40b extends upward a distance further than the outer wall 40a. Stated differently, the inner wall 40b has a vertical height that is greater than a vertical height of the outer wall 40a. The inner wall 40b also has a thickness greater than a thickness of the outer wall 40a.

The lid 32 is secured to the battery tray 30 and covers an opening in the battery tray 30. The lid 32 is made of a composite material such as fiberglass, for example, and is manufactured using injection molding, vacuum molding, or other alternative methods for composite part manufacture. In some forms, the lid 32 is made of a metal material. In one example, the lid 32 is injection molded such that an end portion 37 of the lid 32 includes a parting line X, which facilitates manufacturing of the lid 32 having the alignment features 41a, 41b. The lid 32 includes an upper portion 38, the end portion 37, the plurality of alignment features 41a, 41b, and a lid detachment feature 44. The upper portion 38 is planar and covers the opening defined by the battery tray 30. The end portion 37 extends downward from an end of the upper portion 38 and is disposed within the cavity 42 of the lid receiving portion 39.

The alignment feature 41a is configured to contact an upper surface of the inner wall 40b of the battery tray 30 such that the lid 32 is vertically aligned relative to the battery tray 30. Stated differently, the alignment feature 41a is configured to contact the upper surface of the inner wall 40b of the battery tray 30 such that a gap exists between the end portion 37 and the lower wall 40c within the channel 42. The alignment feature 41a extends downward from an inner surface of the upper portion 38 of the lid 32 and is located inwardly relative to the end portion 37. In one example, the alignment feature 41a comprises a plurality of alignment features spaced apart from each other around the inner surface of the lid 32 and contacting the upper surface of the inner wall 40b. In another example, the alignment feature 41a is a single, continuous alignment feature extending around the inner surface of the lid 32 and contacting the upper surface of the inner wall 40b. In the example illustrated, the alignment feature 41a has a barbed shape such that the alignment feature 41a contacts the upper surface of the inner wall 40b at a point. In another example, the alignment feature 41a can include a rectangular or block shape, for example, such that the alignment feature 41a contacts the upper surface of the inner wall 40b along a plane.

The alignment feature 41b is configured to contact an outer surface of the inner wall 40b of the battery tray 30 such that the lid 32 is laterally aligned relative to the battery tray 30. Stated differently, the alignment feature 41b positions the end portion 37 within the channel 42 such that a gap exists between the end portion 37 and the inner wall 40b and between the end portion 37 and the outer wall 40a within the channel 42. The alignment feature 41b extends laterally from the end portion 37 of the lid 32 within the channel 42.

In the example illustrated, the alignment feature 41b extends laterally inward from the end portion 37 (i.e., toward the battery components 21) and is configured to contact the outer surface of the inner wall 40b of the battery tray 30 such that the lid 32 is laterally aligned relative to the battery tray 30. In another example, the alignment feature 41b extends laterally outward from the end portion 37 (i.e., away from the battery components 21) and is configured to contact the inside surface of the outer wall 40a of the battery tray 30 such that the lid 32 is laterally aligned relative to the battery tray 30. In one example, the alignment feature 41b comprises a plurality of alignment features spaced apart from each other around the end portion 37 of the lid 32. In another example, the alignment feature 41b is a single, continuous alignment feature extending around the end portion 37 of the lid 32. In the example illustrated, the alignment feature 41b has a barbed shaped. In another example, the alignment feature 41b can include a rectangular or block shape, for example, or any other suitable shape for laterally positioning the end portion 37 within the channel 42. In the example illustrated, the alignment feature 41b is located at a distal end 48 of the end portion 37. In another example, the alignment feature 41b extends from the end portion 37 and can be located at any position between the distal end 48 of the end portion 37 and a proximal end 50 of the end portion 37 within the channel 42.

The lid detachment feature 44 is associated with the end portion 37 of the lid 32 and is configured to provide guidance to a service technician (not shown) when detaching the lid 32 from the battery tray 30 as described in more detail below. The lid detachment feature 44 is located external to the channel 42. Stated differently, the lid detachment feature 44 is located outside of the channel 42 formed by the walls 40a, 40b, 40c. The lid detachment feature 44 is vertically spaced apart from an upper surface of the outer wall 40a and extends around the end portion 37 of the lid 32. In the example illustrated, the lid detachment feature 44 is barbed shape and extends laterally outward from the end portion 37 of the lid 32. In other examples, the lid detachment feature 44 comprises indicia (e.g., signs, markings, etc.) that guides the service technician to cut below the indicia. The plurality of connecting members (not shown) are secured to the side wall 40 of the battery tray 30. In this way, mechanical fasteners connect the battery tray 30 to the vehicle frame 12 of the vehicle 10.

A sealant 36 such as mastic sealant is disposed within a portion of the channel 42 and secures the battery tray 30 and the lid 32 to each other. The sealant 36 further seals the internal cavity 43 formed by the battery tray 30 and the lid 32. Stated differently, the sealant 36 is located between the end portion 37 and the walls 40a, 40b, 40c such that a sealed joint is created that inhibits fluids and debris from entering into the internal cavity 43.

With continued reference to FIG. 3, a method 200 for attaching the lid 32 and battery tray 30 to each other will be described in detail. First, at 202, the sealant 36 is disposed within the cavity 42 of the battery tray 30. Then, at 206, the lid 32 is positioned over the battery tray 30 such that the lid 32 self-aligns with the battery tray 30. That is, the alignment feature 41a contacts the inner wall 40b to vertically align the lid 32 relative to the battery tray 30 and the end portion 37 is disposed within the cavity 42. In this way, the alignment feature 41b laterally aligns the lid 32 relative to the battery tray 30, thus, providing a uniform gap between the end portion 37 and the side wall 40 within the cavity 42. Then, at 210, the sealant 36 cures such that a sealed joint is created between the end portion 37 and the walls 40a, 40b, 40c, thereby interlocking the lid 32 and the battery tray 30 to each other.

With continued reference to FIG. 4, a method 300 for detaching the lid 32 and battery tray 30 from each other will be described in detail. First, at 302, the service technician locates the lid detachment feature 44 associated with the end portion 37 of the lid 32. Then, at 306, the service technician cuts through the end portion 37 with a laser 54 or other tools at a location between the lid detachment feature 44 and the upper surface of the wall 40a. The service technician cuts through the end portion 37 while the battery housing assembly 14 is being rotated by a holding device (not shown). The inner wall 40b of the battery tray 30 provides a backstop for the laser 54 or tools to inhibit any burn through or penetration to the battery components 21.

The battery housing assembly 14 of the present disclosure provides the benefit of allowing the lid 32 to self-align to the battery tray 30 and cavity 42 during manufacturing. The battery housing assembly 14 of the present disclosure also provides the benefit of quickly removing the lid 32 to service and/or recycle the battery components 21. The battery housing assembly 14 of the present disclosure also simultaneously provides greater surface contact area around the perimeter of the battery assembly for greater lid-to-tray retention strength against separation forces in the X or Y direction as compared to flush-mount top-down lids which utilize a discrete fasteners of limited contact surface area. The battery housing assembly 14 of the present disclosure also reduces error states cause by corrosion of fasteners over life and inability to remove affected fasteners and lid with normal tools.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A battery housing assembly for housing battery components of an electric vehicle, the battery housing assembly comprising:
    a battery tray comprising an outer surface and an inner surface that cooperate to define a channel located outwardly relative to the battery components;
    a lid secured to the battery tray and comprising an end portion disposed within the channel, the lid further comprising at least one alignment feature configured to align the lid and the battery tray; and
    a sealant disposed within a portion of the channel of the battery tray and configured to secure the battery tray and the lid to each other, the sealant further configured to seal an internal cavity of the battery housing assembly,
    wherein the at least one alignment feature comprises a first alignment feature that extends laterally from the end portion of the lid to align the lid and the battery tray in a lateral direction, the first alignment feature includes a distal end located between the inner surface and the outer surface of the channel.

2. The battery housing assembly of claim 1, wherein the battery tray is made of a metal material.

3. The battery housing assembly of claim 1, wherein the lid is made of a composite material.

4. The battery housing assembly of claim 1, wherein the battery tray comprises an outer wall including the inner surface and an inner wall including the outer surface that cooperate to define the channel, and wherein the inner wall is located inwardly relative to the end portion of the lid.

5. The battery housing assembly of claim 4, wherein the lid comprises a planar upper portion, and wherein the at least one alignment feature comprises a second alignment feature that extends downwardly from an inner surface of the planar upper portion to contact the inner wall of the battery tray.

6. The battery housing assembly of claim 1, wherein the battery tray comprises an outer wall and an inner wall that cooperate to define the channel, and wherein the inner wall has a height that is greater than height of the outer wall.

7. The battery housing assembly of claim 6, wherein the inner wall has a thickness greater than a thickness of the outer wall.

8. The battery housing assembly of claim 1, wherein the lid comprises a planar upper portion, and wherein the at least one alignment feature comprises a second alignment feature that extends downwardly from an inner surface of the planar upper portion to contact the battery tray.

9. The battery housing assembly of claim 8, further comprising a lid detachment feature associated with the end portion of the lid and located external to the channel.

10. The battery housing assembly of claim 1, further comprising a lid detachment feature associated with the end portion of the lid and located external to the channel.

11. The battery housing assembly of claim 10, wherein the battery tray comprises an outer wall and an inner wall that cooperate to define the channel, and wherein the lid detachment feature is vertically spaced apart from an upper surface of the outer wall.

12. A battery housing assembly for housing battery components of an electric vehicle, the battery housing assembly comprising:
   a battery tray comprising an outer wall and an inner wall that cooperate to define a channel located outwardly relative to the battery components, the inner wall extending upward a distance further than the outer wall;
   a lid secured to the battery tray and comprising an end portion disposed within the channel, the lid further comprising at least one alignment feature configured to align the lid and the battery tray; and
   a sealant disposed within a portion of the channel of the battery tray and configured to secure the battery tray and the lid to each other, the sealant further configured to seal an internal cavity of the battery housing assembly,
   wherein the at least one alignment feature comprises a first alignment feature that extends downward from the lid and contacts the battery tray.

13. The battery housing assembly of claim 12, wherein the lid comprises a planar upper portion, and wherein the first alignment feature extends downwardly from an inner surface of the planar upper portion to contact the inner wall of the battery tray.

14. The battery housing assembly of claim 12, wherein the inner wall has a thickness greater than a thickness of the outer wall.

15. The battery housing assembly of claim 12, wherein the at least one alignment feature comprises a second alignment feature that is disposed within the channel of the battery tray and extends laterally from the end portion of the lid to align the lid and the battery tray in a lateral direction.

16. The battery housing assembly of claim 12, further comprising a lid detachment feature associated with the end portion of the lid and located external to the channel.

17. The battery housing assembly of claim 16, wherein the lid detachment feature is vertically spaced apart from an upper surface of the outer wall.

18. A battery housing assembly for housing battery components of an electric vehicle, the battery housing assembly comprising:
   a battery tray comprising an outer wall and an inner wall that cooperate to define a channel located outwardly relative to the battery components, the inner wall extending upward a distance further than the outer wall;
   a lid removably secured to the battery tray and comprising an upper planar portion and an end portion extending from the upper planar portion and disposed within the channel, the lid further comprising a plurality of alignment features configured to align the lid and the battery tray;
   a sealant disposed within a portion of the channel of the battery tray and configured to secure the battery tray and the lid to each other, the sealant further configured to seal an internal cavity of the battery housing assembly; and
   a lid detachment feature associated with the end portion of the lid and located external to the channel,
   wherein a first alignment feature of the plurality of alignment features extends downwardly from an inner surface of the upper planar portion to contact the inner wall of the battery tray, the first alignment feature located inward of the end portion.

19. The battery housing assembly of claim 18, wherein the plurality of alignment features comprises:
   a second alignment feature disposed within the channel of the battery tray and extending laterally from the end portion of the lid to align the lid and the battery tray in a lateral direction.

* * * * *